United States Patent [19]

Kubota et al.

[11] Patent Number: 5,218,043

[45] Date of Patent: Jun. 8, 1993

[54] POLYARYLENE SULFIDE RESIN COMPOSITION AND PROCESS FOR PRODUCING THE SAME

[75] Inventors: Masaru Kubota, Fijinomiya; Hajime Serizawa, Mishima; Hiroyuki Sano, Fuji, all of Japan

[73] Assignee: Polyplastics Co., Ltd., Osaka, Japan

[21] Appl. No.: 815,033

[22] Filed: Dec. 31, 1991

[30] Foreign Application Priority Data

Jan. 16, 1991 [JP] Japan .................. 3-3355

[51] Int. Cl.$^5$ .................. C08L 81/00; C08L 77/08
[52] U.S. Cl. .................. 524/609; 525/437; 525/445; 525/537
[58] Field of Search .................. 524/609; 525/437, 445

[56] References Cited

U.S. PATENT DOCUMENTS

| | | | |
|---|---|---|---|
| 4,528,346 | 7/1985 | Sugie et al. | 525/523 |
| 4,748,169 | 5/1988 | Izutsu et al. | 524/500 |
| 4,917,957 | 4/1990 | Nitoh et al. | 428/447 |
| 4,997,866 | 5/1991 | Nakata et al. | 525/445 |

FOREIGN PATENT DOCUMENTS 59-207921 11/1984 Japan .

*Primary Examiner*—John C. Bleutge
*Assistant Examiner*—Mark Sweet
*Attorney, Agent, or Firm*—Depaoli & O'Brien

[57] ABSTRACT

The present invention is directed to a polyarylene sulfide resin composition which further contains a polyester resin and has well-balanced properties with respect to toughness, impact resistance and melt viscosity by improving the compatibility of the polyarylene sulfide resin with the polyester resin. The composition comprises a polyarylene sulfide resin, a polyester resin, and 0.1 to 15 parts by weight per 100 parts by weight resin of a compound having in its molecule a carbon-carbon double bond and an epoxy group and, further, including optional ingredients such as a radical initiator and/or filler.

15 Claims, No Drawings

POLYARYLENE SULFIDE RESIN COMPOSITION AND PROCESS FOR PRODUCING THE SAME

BACKGROUND OF THE INVENTION

The present invention relates to an improved polyarylene sulfide resin composition and a process for producing the same. More particularly, the present invention is concerned with a polyarylene sulfide resin composition having excellent impact resistance and heat resistance, comprising a resin component composed of a polyarylene sulfide resin and a polyester resin and, blended and melt-kneaded therewith, a specified epoxy-containing compound and, if necessary, a radical initiator, and a process for producing the same.

In recent years, a thermoplastic resin having high heat resistance, high chemical resistance and, further, flame retardancy has been required as the material of construction for electrical and electronic equipment, automobiles and chemical equipment.

A polyarylene sulfide resin represented by polyphenylene sulfide is one of the resins capable of meeting the above-described requirement and has been in increased demand also by virtue of having excellent properties relative to the cost of the resin. Polyphenylene sulfide resin, however, has a severe drawback in that it is inferior in toughness and more fragile than engineering plastics such as polyacetal, nylon, polycarbonate and polybutylene terephthalate.

The incorporation of a fibrous reinforcement, such as a glass fiber or a carbon fiber, or other filler is known as a means for solving the above-mentioned problem. The addition of a fibrous reinforcement contributes to a remarkable improvement in the performance, such as strength, rigidity, toughness and heat resistance of the resin. Even when the above-described reinforcement is incorporated, however, the toughness of polyphenylene sulfide is inferior to that of other engineering plastics, which often limits the use of polyphenylene sulfide in many applications despite the excellent chemical resistance, heat resistance and flame retardancy of the resin.

On the other hand, polymer blending of the polyarylene resin with a flexible polymer is a promising method for improving the impact resistance. This method, however, has drawbacks such as the surface of the molded article being liable to peel away as there exists only a few flexible polymers which have excellent heat and chemical resistances. Moreover, the flexible polymers have poor compatibility with polyarylene sulfide resin. Accordingly this blending method cannot provide a polyarylene sulfide resin composition having improved mechanical and physical properties, such as toughness and impact resistance, without detriment to the features inherent in the polyarylene sulfide resin.

The present inventors have made intensive studies on a polyarylene sulfide resin composition having high toughness and impact resistance and a process for producing the same and, as a result, have found that the addition of a silane compound having an alkoxysilane group to a resin component comprising a polyarylene sulfide resin and a polyester resin contributes to an improvement in the impact resistance, and have filed a patent application concerning this finding as Japanese Patent Application No. 197003/1990. According to the above-described composition and process for producing the same, although good toughness and impact resistance can be obtained, there is a tendency that the melt viscosity becomes so high as to inhibit the production of a thin-walled molded article by injection molding or the like. The solution to this problem has been desired in the art.

SUMMARY OF THE INVENTION

The present inventors have made further studies with a view to developing a polyarylene sulfide resin composition having well balanced properties with respect to the toughness, impact resistance and melt viscosity. As a result, the invention have found that the incorporation of a compound having in its molecule a carbon double bond and an epoxy group and, if necessary, a radical initiator into a blend of a polyarylene sulfide resin and a polyester resin followed by a melt kneading treatment improves the compatibility between the resin components and enables a molding material having very high toughness and impact resistance suitable for practical use to be produced without significantly raising the melt viscosity of the molding material.

Thus, the present invention relates to a polyarylene sulfide resin composition comprising 100 parts by weight of a resin component composed of 97 to 20 parts by weight of a polyarylene sulfide resin (A) and 3 to 80 parts by weight of a polyester resin (B), 0.1 to 15 parts by weight of a compound having in its molecule a carbon double bond and an epoxy group (C), 0 to 20% by weight, based on the component (C), of a radical initiator (D), and 0 to 400 parts by weight of any one member or a mixture of members selected from the group consisting of a fibrous filler, a particulate filler, a flaky filler and a hollow filler, and also to a process for producing a polyarylene sulfide resin composition comprising a heat-melt kneading treatment step, wherein the heat-melt kneading treatment is conducted in the coexistence of at least said components (A), (B) and (C) and, if necessary, said component (D) for a period of 30 sec or more.

DETAILED DESCRIPTION OF THE INVENTION

The polyarylene sulfide resin as the component (A) in the present invention is mainly composed of repeating units —Ar—S— wherein Ar represents an arylene group. Examples of the arylene group (—Ar—) include a p-phenylene group, a m-phenylene group, an o-phenylene group, a substituted phenylene group wherein the substituent is an alkyl group, preferably a $C_1$ to $C_5$ alkyl group, or a phenylene group, a p,p'-diphenylene sulfone group, a p,p'-biphenylene group, a p,p'-diphenylene ether group, a p,p'-diphenylene carbonyl group and a naphthalene group.

In accordance with this invention, it is possible to use a polymer comprising the same repeating units in the polyarylene sulfide group composed of the above-described arylene group, that is, a homopolymer. Further, in some instances, a copolymer containing different repeating units is often preferred from the viewpoint of the processability of the composition.

The homopolymer is preferably a substantially linear polymer comprising a p-phenylene sulfide group as the repeating unit wherein use is made of a p-phenylene group as the arylene group.

If a copolymer is desired, use may be made of a combination of two or more different arylene sulfide groups comprising the above-described arylene group. Among others, a combination of a p-phenylene sulfide group as a main component with a m-phenylene sulfide group is particularly preferred. Among them, a substantially linear polymer containing a p-phenylene sulfide group in an amount of 60% by mole, preferably 70% by mole or more is suitable from the viewpoint of the properties such as heat resistance, moldability and mechanical properties.

The copolymer preferably contains a m-phenylene sulfide group in an amount of 5 to 40% by mole, preferably 10 to 25% by mole.

It is preferred that the repeating units of the components of the copolymer be contained in the block form rather than the random form (see, for example, Japanese Patent Laid-Open No. 14228/1986) from the viewpoint of attaining good processability and excellent heat resistance and mechanical properties.

The polyarylene sulfide resin as the component (A) to be used in the present invention may have the processability improved by subjecting a linear polymer having a relatively low molecular weight to oxidative crosslinking or thermal crosslinking to increase the melt viscosity. It is also possible to use a high-molecular weight polymer having a substantially linear structure prepared by the polycondensation of a monomer mainly composed of a difunctional monomer. In many cases, the molded article prepared from the latter polymer, that is, a substantially linear polymer, is more favorable than the former polymer because of its superior properties.

In the polyarylene sulfide resin according to the present invention, it is also possible and favorable to use, besides the above-described polymers, a crosslinked polyarylene sulfide resin prepared by the polymerization of a mixture of the above-described monomer with a monomer having three or more functional groups as part of the monomer component, or a blended resin prepared by blending the crosslinked polyarylene sulfide resin with the above-described linear polymer.

The polyester resin as the component (B) to be used in the present invention comprises a polyester resin prepared by the polycondensation of a dicarboxylic acid, such as terephthalic acid, isophthalic acid, naphthalene-dicarboxylic acid, 4,4'-diphenylenedicarboxylic acid, diphenyl ether dicarboxylic acid, α,β-bis(4-carboxyphenoxy)ethane, adipic acid, sebacic acid, azelaic acid, decanedicarboxylic acid, dodecanedicarboxylic acid, cyclohexanedicarboxylic acid or dimer acid, or the ester forming derivative thereof, with a glycol compound such as ethylene glycol, propylene glycol, butanediol, pentanediol, neopentyl glycol, hexanediol, octanediol, decanediol, cyclohexanedimethanol, hydroquinone, bisphenol A, 2,2-bis(4'-hydroxyethoxyphenyl)propane, xylene glycol, polyethylene ether glycol, polytetramethylene ether glycol or an aliphatic polyester oligomer having hydroxyl groups in its both ends. The polyester resin may be any of a homopolyester and a copolyester.

A hydroxy carboxylic acid such as glycolic acid, a hydroxy acid, a hydroxybenzoic acid, a hydroxyphenylacetic acid or a naphthylglycolic acid, or a lactone compound such as propiolactone, butyrolactone, caprolactone, valerolactone or caprolactone may be used as a comonomer component other than the above-described comonomer component for constituting the copolyester. Further, the polyester may be one having a branched or crosslinked structure wherein use is made of a polyfunctional ester forming portion, such as trimethylolpropane, trimethylolethane, pentaerythritol, trimellitic acid, trimesic acid or pyromellitic acid, in such an amount as will maintain the thermoplastic property.

The polyester includes a halogenated polyester copolymer wherein use is made of a compound having as a substituent a halogen compound in the aromatic nucleus and further having an ester forming group, such as dibromoterephthalic acid, tetrabromoterephthalic acid, tetrachloroterephthalic acid, 1,4-dimethyloltetrabromobenzene, tetrabromobisphenol A, or an ethylene or propylene oxide adduct of tetrabromobisphenol A.

It is also possible to use a polyester elastomer constituting a block copolymer comprising a high-melting point hard segment and a low-melting point soft segment. Examples thereof include a block copolymer comprising a hard segment mainly composed of alkylene terephthalate units and a soft segment composed of an aliphatic polyester or polyether.

Particularly preferred examples of the polyester resin include polyalkylene terephthalates, such as polyethylene terephthalate and polybutylene terephthalate, and copolymers composed mainly of these polyalkylene terephthalates. Particularly preferred examples of the comonomer components for constituting the copolymer include isophthalic acid, bisphenol A, 2,2-bis(β-hydroxyethoxyphenyl)propane and 2,2-bis(β-hydroxyethoxytetrabromophenyl)propane.

Although the amount of use of the polyester resin as the component (B) may vary depending upon the application, it typically will be 3 to 80 parts by weight, preferably 10 to 80 parts by weight based on 100 parts by weight of the total of the polyarylene sulfide resin (A) and the polyester resin (B). When the amount of the polyester resin is less than 3 parts by weight, no sufficient improvement in the toughness of the resin composition can be attained. On the other hand, when the amount exceeds 80 parts by weight, the heat deformation temperature is unfavorably lowered to a great extent. The polyester resin as the component (B) is not limited to one type only, but it is also possible to use a combination of two or more types of polyester resins for the purpose of regulating intended property values.

The present invention is characterized in that a compound having in its molecule a carbon double bond and an epoxy group, for example, a vinyl or allyl compound containing an epoxy group, is incorporated as the component (C). The component (C), typically monomeric, should have a boiling point of 150° C. or above, preferably 200° C. or above, for the purpose of avoiding volatilation and dissipation during the melt kneading. Examples thereof include allyl glycidyl ether, glycidyl acrylate, glycidyl methacrylate, glycidyl vinylbenzoate, glycidyl allylbenzoate, N-[4-(2,3-epoxypropoxy)-3,5-dimethylbenzyl]acrylamide, N-diallylaminoepoxypropane, glycidyl cinnamate, glycidyl cinnamylideneacetate, chalcone glycidyl ether, epoxyhexene, a glycidyl ester of dimer acid, and an ester of an epoxidized higher alcohol with acrylic or methacrylic acid. They may be used also in a combination of two or more of them. Particularly preferred examples thereof include glycidyl methacrylate, glycidyl vinylbenzoate, glycidyl allylbenzoate, N-[4-(2,3-epoxypropoxy)-3,5-dimethylbenzyl]acrylamide and N-diallylaminoepoxypropane.

The amount of use of the component (C) is 0.1 to 15 parts by weight, preferably 1 to 10 parts by weight, based on 100 parts by weight of the total of the polyarylene sulfide resin [component (A)] and the polyester resin [component (B)].

The amount of use of the component (C) varies depending upon the type of the compound and the properties and applications of the intended composition. When the amount is excessively small, no improvement in the dispersibility of the components (A) and (B) can be attained, which reduces the effect of improving the toughness and impact resistance of the resin composition and sometimes causes unfavorable peeling on the surfaces of the molded article. On the other hand, when the amount is excessively large, the melt viscosity becomes so high that problems associated with the molding as well as bleedout often occur.

Although the radical initiator as the component (D) to be used in the present invention is not always necessary, the incorporation of the radical initiator is preferred for the purpose of further improving toughness. There is no particular limitation on the radical initiator as the component (D) as far as it can generate a free radical at the melt kneading temperature. It is possible to use known radical initiators such as azo initiators and peroxide initiators. It is preferred that the decomposition temperature of the initiator be relatively high, and a favorable initiator is one having a one-minute half-life temperature of at least 130° C. or above, preferably 150° C. or above. In view of the above, preferred examples of the radical initiator include 2,5-dimethylhexane 2,5-dihydroperoxide, di-tert-butyl peroxide, tert-butylcumyl peroxide, 2,5-dimethyl-2,5-di(tert-butylperoxy)hexane, 2,5-dimethyl-2,5-di(tert-butylperoxy)hexyne-3, n-butyl 4,4-bis(tert-butylperoxy)valerate, 2,3-dimethyl-2,3-diphenylbutane, 2,3-diethyl-2,3-diphenylbutane, 2,3-dimethyl-2,3-di(p-methylphenyl)butane and 2,3-dimethyl-2,3-di(bromophenyl)butane. They may be used in a combination of two or more of them. The amount of use of the radical initiator as the component (D) is 0 to 20% by weight, preferably 0.1 to 10% by weight, based on the compound (C), that is, the compound having in its molecule a carbon double bond and an epoxy group. Although the amount of the radical initiator added varies depending upon the properties and applications of the intended composition, the use of the radical initiator in an excessive amount often brings about a foaming problem during the melt kneading treatment.

Although the filler as the component (E) to be used in the present invention is not always necessary, the incorporation of the filler is preferred for the purpose of producing a molded article having excellent mechanical strength, heat resistance, dimensional stability, electrical properties and other properties. A fibrous, particulate, flaky or hollow filler may be used according to the purpose.

Examples of the fibrous filler include inorganic fiber substances such as glass fibers, asbestos fibers, carbon fibers, silica fibers, silica-alumina fibers, zirconia fibers, boron nitride fibers, silicon nitride fibers, boron fibers and potassium titanate fibers, and further fibers of metals such as stainless steel, aluminum, titanium, copper and brass. Representative examples of the fibrous filler include glass fibers and carbon fibers. It is also possible to use high-melting organic fibrous substances such as polyamides, fluororesins and acrylic resins.

Examples of the particulate filler include carbon black, silica, quartz power, glass beads, glass powder, silicates such as calcium silicate, aluminum silicate, kaolin, talc, clay, diatomaceous earth and wollastonite, metal oxides such as iron oxide, titanium oxide and alumina, metal carbonates such as calcium carbonate and magnesium carbonate, metal sulfates such as calcium sulfate and barium sulfate, and other fillers such as silicon carbide, silicon nitride, boron nitride and various metal powders.

Examples of the flaky filler include mica, glass flakes and various metal foils. Examples of the hollow filler include shirasu balloon, metal balloon and glass balloon.

It is preferred that the filler be subjected to a surface treatment with an organosilane, an organoborane, an organotitanate or the like.

The above-described inorganic fillers may be used alone or in a combination of two or more of them. A combination of a fibrous filler, particularly a glass fiber or a carbon fiber, with a particulate or flaky filler is particularly preferred for the purpose of attaining a combination of mechanical strength with dimensional stability, electrical properties, etc.

The amount of the inorganic filler is 400 parts by weight or less based on 100 parts by weight of the total of the resin components (A) and (B). When the amount exceeds the above-described range, the moldability and toughness are inhibited unfaborably. The amount is particularly preferably 250 parts by weight or less.

The composition of the present invention may be blended with a minor amount of other thermoplastic resins, such as polyvinyl chloride resins, polyvinylidene chloride resins, polycarbonate resins, polyamide resins, polyolefin resins, natural rubbers or synthetic rubbers, in such an amount as will not spoil the purpose of the composition. Further, if necessary, it is also possible to add additives such as flame retardants, antioxidants, ultraviolet inhibitors, lubricants, releasing agents, nucleating agents, foaming agents, crosslinking agents, colorants, etc.

The composition of the present invention may be prepared by various known processes. In this invention, it is necessary to conduct heat melting in the coexistence of at least the three components, that is, the components (A), (B) and (C), and further optionally the component (D) followed by a kneading treatment for 30 sec. The component (E) and other components may be simultaneously or separately added. Specifically, for example, the components (A), (B) and (C) and optionally the components (D) and (E) are homogeneously mixed with each other by means of a mixer, such as a tumbler or a Henschel mixer, and the mixture is fed in a single-screw or double-screw extruder to conduct a melt kneading treatment, thereby preparing pellets. It is preferred to use the following method. A solution of the components (C) and (D) is previously prepared and added to the components (A) and (B) in powdery form, and the mixture is dried for use in the mixing. The solution blending method as described above is particularly preferred for the component (D) used in a minor amount because the effect of improving toughness, etc., can be advantageously attained by virtue of homogeneous dispersion. The component (E) and other components may be added during or after the melt kneading treatment.

The kneading temperature is 5° to 100° C. higher than the melting temperature of the resin component and particularly preferably 10° to 60° C. higher than the melting temperature of the resin. When the temperature is excessively high, unfavorable decomposition of the resin and abnormal reaction occur. Although the kneading time will vary depending upon the treatment temperature and the types and amount of addition of the components (C) and (D), it is in the range of from 30 sec to 15 min, preferably 1 to 10 min.

Although the details of the mechanism by which the effect of improving the toughness of the resin composition can be attained has not yet been fully elucidated, it is conceivable that the polyarylene sulfide resin is bonded to the polyester resin through the component (C) to improve the compatibility of the polyarylene sulfide resin with the polyester resin, which enables a composition having a high toughens to be prepared without significantly increasing the melt viscosity.

As is apparent from the foregoing description and the following Examples, according to the polyarylene sulfide resin composition of the present invention, the dispersibility of the individual components can be improved, which makes it possible to provide a molding material having a good appearance and very high toughness and impact resistance without significantly increasing the melt viscosity.

EXAMPLES

The present invention will now be described in more detail with reference to the following Examples, although the invention is not to be construed as being limited to these Examples only.

EXAMPLES 1 TO 7 AND COMPARATIVE EXAMPLES 1 AND 2

60 parts by weight of a polyphenylene sulfide resin (PPS) (melting point: 285° C.; melt viscosity: 500 P as measured at 310° C. under a shear rate of 1200 sec$^{-1}$) was blended with 40 parts by weight of a polyethylene terephthalate resin (PET) (trade name: Bellpet EFG-85A; manufactured by Kanebo, Ltd.), and a previously prepared 20% methanol solution of N-(4-(2,3-epoxypropoxy)-3,5-dimethylbenzyl)acrylamide (C-1) and a previously prepared 10% acetone solution of 2,5-dimethyl-2,5-di(tert-butylperoxy)hexane (D-1) were added thereto and mixed according to the formulation specified in Table 1. After the solvent was removed, a glass fiber (a chopped strand having a diameter of 10 μm and a length of 3 mm) was further added according to need and previous mixing was conducted by means of a Henschel mixer for 5 min. The mixtures were melt-kneaded by means of an extruder having a cylinder temperature of 310° C. (residence time; about 2 min) to give pellets of polyarylene sulfide resin compositions listed in Table 1.

Then, ASTM test pieces were molded by means of an injection molding machine under the conditions of a cylinder temperature of 290° C. and a mold temperature of 150° C. and applied to a tensile test and an impact test. Further, the pellets of the above-described resin compositions were subjected to the measurement of the melt viscosity at 290° C. under a shear rate of 1200 sec$^{-1}$.

The results are summarized in Table 1.

EXAMPLES 8 AND 9 AND COMPARATIVE EXAMPLES 3 AND 4

The above-described PPS resin, PET resin, C-1 and D-1 were blended according to the formulation specified in Table 2. Thereafter, the procedure of the Examples 1 to 7 was repeated. The results are given in the Table 2.

EXAMPLES 10 TO 14

The procedure of the Example 2 was repeated, except that glycidyl methacrylate (C-2) or N-diallylaminoepoxypropane (C-3) was used instead of the C-1 used in the Example 2 (Examples 13 and 14, respectively) and 2,5-dimethyl-2,5-di(tert-butylperoxy)hexyne-3 (D-2), 2,5-dimethyl-2,5-di(tert-butylperoxy)hexane (D-3) or 2,5-dimethylhexane-2,5-dihydroperoxide (D-4) was used instead of the D-1 (Examples 10 to 12, respectively). The results are given in Table 3.

EXAMPLES 15 TO 22 AND COMPARATIVE EXAMPLES 5 AND 6

The procedure as described above was repeated, except that a polybutylene terephthalate resin (PBT) (trade name: Duranex 2002; manufactured by Polyplastics Co., Ltd.) was used instead of the polyester resin as the component (B) and the components (C) and (D) and optionally the component (E) of various types listed in Table 4 were incorporated in proportions specified therein. The results are given in the same Table.

TABLE 1

|  | Comp. Ex. 1 | Ex. 1 | Ex. 2 | Ex. 3 | Ex. 4 | Ex. 5 | Ex. 6 | Comp. Ex. 2 | Ex. 7 |
|---|---|---|---|---|---|---|---|---|---|
| Formulation (pt. wt.) | | | | | | | | | |
| component (A) polyphenylene sulfide resin | 60 | 60 | 60 | 60 | 60 | 60 | 60 | 60 | 60 |
| component (B) PET resin | 40 | 40 | 40 | 40 | 40 | 40 | 40 | 40 | 40 |
| component (C) C-1 | — | 0.5 | 3 | 10 | 3 | 3 | 3 | — | 3 |
| component (D) D-1 (wt. % based on component (C)) | — | 0.5 | 0.5 | 0.5 | — | 5 | 10 | — | 0.5 |
| component (E) glass fiber | — | — | — | — | — | — | — | 67 | 67 |
| properties of compsn. | | | | | | | | | |
| tensile strength [kgf/cm$^2$] | 500 | 580 | 640 | 670 | 600 | 650 | 660 | 1500 | 2130 |
| tensile elongation (%) | 3.0 | 5.1 | 7.1 | 7.5 | 6.0 | 7.2 | 7.3 | 1.6 | 5.1 |
| Izod impact strength [kg · cm/cm] | | | | | | | | | |
| notched | 1.3 | 2.1 | 3.0 | 3.5 | 2.5 | 3.1 | 3.3 | 5.3 | 10.8 |
| unnotched | 9 | 26 | 37 | 41 | 31 | 39 | 40 | 23 | 47 |
| Thermal deformation temp. [°C.] load: 18.6 kg | 117 | 114 | 112 | 111 | 113 | 112 | 111 | 250 | 245 |

TABLE 1-continued

|  | Comp. Ex. 1 | Ex. 1 | Ex. 2 | Ex. 3 | Ex. 4 | Ex. 5 | Ex. 6 | Comp. Ex. 2 | Ex. 7 |
|---|---|---|---|---|---|---|---|---|---|
| melt viscosity [poise] | 420 | 520 | 600 | 630 | 570 | 635 | 640 | 850 | 1050 |

TABLE 2

|  | Comp. Ex. 3 | Ex. 8 | Comp. Ex. 1 | Ex. 2 | Comp. Ex. 4 | Ex. 9 |
|---|---|---|---|---|---|---|
| Formulation (pt. wt.) | | | | | | |
| component (A) polyphenylene sulfide resin | 80 | 80 | 60 | 60 | 40 | 40 |
| component (B) PET resin | 20 | 20 | 40 | 40 | 60 | 60 |
| component (C) C-1 | — | 3 | — | 3 | — | 3 |
| component (D) D-1 (wt. % based on component (C)) | — | 0.5 | — | 0.5 | — | 0.5 |
| component (E) glass fiber | — | — | — | — | — | — |
| properties of compsn. | | | | | | |
| tensile strength [kgf/cm$^2$] | 510 | 650 | 500 | 640 | 500 | 600 |
| tensile elongation (%) | 1.7 | 5.2 | 3.0 | 7.1 | 3.5 | 8.1 |
| Izod impact strength [kg · cm/cm] | | | | | | |
| notched | 1.1 | 2.1 | 1.3 | 3.0 | 1.4 | 3.7 |
| unnotched | 8 | 25 | 9 | 37 | 11 | 42 |
| thermal deformation temp. [°C.] load: 18.6 kg | 118 | 114 | 117 | 112 | 100 | 98 |
| melt viscosity [poise] | 425 | 610 | 420 | 600 | 400 | 580 |

TABLE 3

|  | Comp. Ex. 1 | Ex. 2 | Ex. 10 | Ex. 11 | Ex. 12 | Ex. 13 | Ex. 14 |
|---|---|---|---|---|---|---|---|
| Formulation (pt. wt.) | | | | | | | |
| component (A) polyphenylene sulfide resin | 60 | 60 | 60 | 60 | 60 | 60 | 60 |
| component (B) PET resin | 40 | 40 | 40 | 40 | 40 | 40 | 40 |
| component (C) | | | | | | | |
| C-1 | — | 3 | 3 | 3 | 3 | — | — |
| C-2 | — | — | — | — | — | 3 | — |
| C-3 | — | — | — | — | — | — | 3 |
| component (D) (wt. % based on component (C)) | | | | | | | |
| D-1 | — | 0.5 | — | — | — | 0.5 | 0.5 |
| D-2 | — | — | 0.5 | — | — | — | — |
| D-3 | — | — | — | 0.5 | — | — | — |
| D-4 | — | — | — | — | 0.5 | — | — |
| properties of compsn. | | | | | | | |
| tensile strength [kgf/cm$^2$] | 500 | 640 | 630 | 610 | 615 | 610 | 610 |
| tensile elongation (%) | 3.0 | 7.1 | 6.8 | 6.2 | 6.3 | 6.1 | 6.0 |
| Izod impact strength [kg · cm/cm] | | | | | | | |
| notched | 1.3 | 3.0 | 2.9 | 2.7 | 2.8 | 2.6 | 2.5 |
| unnotched | 9 | 37 | 35 | 32 | 33 | 31 | 31 |
| thermal deformation temp. [°C.] load: 18.6 kg | 117 | 112 | 112 | 113 | 113 | 113 | 113 |
| melt viscosity [poise] | 420 | 600 | 600 | 580 | 590 | 580 | 580 |

TABLE 4

|  | Comp. Ex. 5 | Ex. 15 | Ex. 16 | Ex. 17 | Ex. 18 | Ex. 19 | Ex. 20 | Comp. Ex. 6 | Ex. 21 | Ex. 22 |
|---|---|---|---|---|---|---|---|---|---|---|
| Formulation (pt. wt.) | | | | | | | | | | |
| component (A) polyphenylene | 60 | 60 | 60 | 60 | 60 | 60 | 60 | 60 | 60 | 60 |

TABLE 4-continued

|  | Comp. Ex. 5 | Ex. 15 | Ex. 16 | Ex. 17 | Ex. 18 | Ex. 19 | Ex. 20 | Comp. Ex. 6 | Ex. 21 | Ex. 22 |
|---|---|---|---|---|---|---|---|---|---|---|
| sulfide resin component (B) | 40 | 40 | 40 | 40 | 40 | 40 | 40 | 40 | 40 | 40 |
| PBT resin component (C) |  |  |  |  |  |  |  |  |  |  |
| C-1 | — | 3 | 3 | 3 | 3 | — | — | — | 3 | — |
| C-2 | — | — | — | — | — | 3 | — | — | — | 3 |
| C-3 | — | — | — | — | — | — | 3 | — | — | — |
| component (D) (wt. % based on component (C)) |  |  |  |  |  |  |  |  |  |  |
| D-1 | — | 0.5 | — | — | — | 0.5 | 0.5 | — | 0.5 | 0.5 |
| D-2 | — | — | 0.5 | — | — | — | — | — | — | — |
| D-3 | — | — | — | 0.5 | — | — | — | — | — | — |
| D-4 | — | — | — | — | 0.5 | — | — | — | — | — |
| component (E) glass fiber | — | — | — | — | — | — | — | 67 | 67 | 67 |
| properties of compsn. |  |  |  |  |  |  |  |  |  |  |
| tensile strength [kgf/cm$^2$] | 360 | 600 | 580 | 550 | 560 | 560 | 560 | 1450 | 2020 | 2000 |
| tensile elongation (%) | 4.0 | 6.1 | 5.7 | 5.0 | 5.2 | 5.1 | 5.0 | 1.4 | 4.5 | 4.4 |
| Izod impact strength [kg · cm/cm] |  |  |  |  |  |  |  |  |  |  |
| notched | 1.2 | 2.8 | 2.6 | 2.0 | 2.2 | 2.1 | 2.0 | 5.0 | 10.5 | 10.0 |
| unnotched | 13 | 33 | 30 | 23 | 25 | 23 | 22 | 20 | 44 | 42 |
| thermal deformation temp. [°C.] load: 18.6 kg | 116 | 111 | 112 | 113 | 113 | 113 | 113 | 250 | 245 | 245 |
| melt viscosity [poise] | 410 | 580 | 580 | 560 | 570 | 560 | 560 | 820 | 1030 | 1020 |

What we claim is:

1. A polyarylene sulfide resin composition comprising 100 parts by weight of a resin component composed of 97 to 20 parts by weight of a polyarylene sulfide resin (A) and 3 to 80 parts by weight of a polyester resin (B), 0.1 to 15 parts by weight of N-[4-(2,3-epoxypropoxy)-3,5-dimethylbenzyl]acrylamide (C), 0 to 20% by weight, based on component (C), of a radical initiator (D), and 0 to 400 parts by weight of at least one member selected from the group consisting of a fibrous filler, a particulate filler, a flaky filler and a hollow filler.

2. The resin composition according to claim 1, wherein the component (D) is a radical initiator having a one-minute half-life temperature of at least 130° C.

3. The resin composition according to claim 1 wherein said polyarylene sulfide resin (A) is polyphenylene sulfide.

4. The resin composition according to claim 3 wherein said polyphenylene sulfide is a homopolymer composed of p-phenylene sulfide units.

5. The resin composition according to claim 3 wherein said polyphenylene sulfide is a copolymer.

6. The resin composition according to claim 5 wherein said copolymer comprises p-phenylene sulfide units and m-phenylene sulfide units.

7. The resin composition according to claim 1 wherein said polyester resin (B) comprises a polyalkylene terephthalate.

8. The resin composition according to claim 7 wherein said polyalkylene terephthalate is selected from the group consisting of polyethylene terephthalate and polybutylene terephthalate.

9. The resin composition according to claim 1 wherein said resin component is composed of 90 to 20 parts by weight of said polyarylene sulfide resin (A) and 10 to 80 parts by weight of said polyester resin (B).

10. The resin composition according to claim 1 wherein said radical initiator (D) is present in amounts of about 0.1 to 10% by weight based on the amount of compound (C).

11. The resin composition according to claim 1 which includes a positive amount of said filler.

12. The resin composition according to claim 11 wherein said filler comprises a mixture of fibrous filler and a particulate or flaky filler.

13. The resin composition according to claim 11 wherein said filler comprises glass fiber.

14. A process for producing a polyarylene sulfide resin composition comprising a heat-melt kneading treatment step, wherein the heat-melt kneading treatment is conducted in the coexistence of at least said components (A), (B) and (C) according to claim 1 and, optionally, said component (D) for a period of at least 30 sec.

15. The process according to claim 14 wherein said polyarylene sulfide resin (A) comprises polyphenylene sulfide.

* * * * *